United States Patent
Jain et al.

(10) Patent No.: US 11,411,478 B2
(45) Date of Patent: Aug. 9, 2022

(54) HIGH STARTING TORQUE DIRECT LINE OPERATED ENERGY EFFICIENT MOTOR

(71) Applicant: Shakti Pumps (I) Ltd., Dhar (IN)

(72) Inventors: Chinmay Jain, Dhar (IN); Bharat Singh Parihar, Dhar (IN); B. M. Sharma, Dhar (IN)

(73) Assignee: Shakti Pumps (I) Ltd., Pithampur (IN)

( * ) Notice: Subject to any disclaimer, the term of this patent is extended or adjusted under 35 U.S.C. 154(b) by 622 days.

(21) Appl. No.: 15/729,933

(22) Filed: Oct. 11, 2017

(65) Prior Publication Data

US 2018/0254689 A1 Sep. 6, 2018

(51) Int. Cl.
| | | |
|---|---|---|
| H02K 1/27 | (2022.01) | |
| H02K 1/276 | (2022.01) | |
| H02K 21/46 | (2006.01) | |
| H02K 21/14 | (2006.01) | |
| H02K 3/02 | (2006.01) | |

(52) U.S. Cl.
CPC ............... *H02K 21/46* (2013.01); *H02K 3/02* (2013.01); *H02K 21/14* (2013.01); *H02K 1/27* (2013.01); *H02K 1/276* (2013.01)

(58) Field of Classification Search
CPC ...... H02K 21/14; H02K 21/042; H02K 21/46; H02K 3/02
USPC ....................... 310/156.53, 56, 74–79, 81–84
See application file for complete search history.

(56) References Cited

U.S. PATENT DOCUMENTS

| | | | |
|---|---|---|---|
| 4,358,696 A | 11/1982 | Liu | |
| 4,922,152 A | 5/1990 | Gleghorn | |
| 6,844,652 B1 | 1/2005 | Chu | |
| 7,923,881 B2 * | 4/2011 | Ionel | H02K 21/46 310/156.53 |
| 2003/0222516 A1 * | 12/2003 | Cleanthous | H02K 15/03 310/50 |
| 2004/0239202 A1 * | 12/2004 | Dooley | H02K 21/046 310/184 |
| 2005/0023923 A1 * | 2/2005 | Chu | H02K 1/276 310/211 |
| 2006/0082237 A1 * | 4/2006 | Kerlin | H02K 19/06 310/265 |
| 2009/0134734 A1 * | 5/2009 | Nashiki | B60L 7/00 318/400.27 |
| 2014/0191596 A1 * | 7/2014 | Wu | H02K 3/12 310/52 |
| 2017/0110944 A1 * | 4/2017 | Nigo | H02K 1/02 |

* cited by examiner

*Primary Examiner* — Gary A Nash
(74) *Attorney, Agent, or Firm* — Craft Chu PLLC; Andrew W. Chu

(57) ABSTRACT

The high efficiency motor employing the principle of three phase induction motor and permanent magnet synchronous motor includes a stator assembly and a rotor assembly. The rotor assembly includes a rotor shaft, a rotor stack assembly, a rotor cover and end ring. The rotor stack assembly includes a stamping stack, a conductor bar and a magnet. The stamping stack has dedicated slots for the conductor bar and the magnet. The rotor cover is fitted on the rotor stack, wherein both axial ends of the rotor cover are closed by end rings.

6 Claims, 3 Drawing Sheets

HIGH STARTING TORQUE DIRECT LINE OPERATED ENERGY EFFICIENT MOTOR

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to an energy efficient motor. More particularly, the present invention relates to a high starting torque energy efficient motor employing the principle of a three phase induction motor and permanent magnet synchronous motor.

2. Description of Related Art Including Information Disclosed Under 37 CFR 1.97 and 37 CFR 1.98

The basic requirement of a motor to start and run successfully depends on two components that are torque producing component (iq) and flux producing component (id). In case of an induction motor as soon as line voltage is applied a rotating magnetic field is produced leading to current in the short-circuited rotor bars, the current on the stator winding and rotor bars interacted with each other to form starting torque, while running the induction motor operates with a slip lead to rotor current and rotor losses. The power factor of the induction motor is low leading to higher run current for the same real power. This higher current leads to stator winding losses, therefore induction motor is proven but less energy efficient option to convert AC power to mechanical power.

The permanent magnet synchronous motor uses only magnet in the construction of rotor have own excitation, similar to the induction motor when current flows in the stator winding, rotating magnetic field introduced but due to high frequency of the rotating magnetic field rotor is unable to lock with magnetic field of the stator. At a particular instant, rotor and stator poles might be of same polarity causing repulsive force on rotor and the very next second it will be facing opposite poles causing attractive force. But due to inertia of the rotor & frequently changing attractive & repulsive forces rotor is unable to rotate in any direction, therefore permanent magnet synchronous motor demands for the employment of drive system for its successful start & run.

Such a motor is disclosed in U.S. Pat. No. 6,844,652 B1. Said invention relates to a rotor structure of line-start permanent magnet (LSPM) synchronous motor that includes a shaft; four fan-shaped magnetic poles each having a first eccentric circular arcs of the surface of the magnetic poles which has a center O1 that is offset from the center O of the rotor with an offset length OS1 and which makes the maximum thickness of the air gap roughly two to five times as much as the minimum thickness of the air gap; four permanent magnets disposing in the inner loop of each of the fan-shaped magnetic poles. A plurality of pear-shaped conductor slots disposing in equal spaces in the outer loop of the rotor in each of the fan-shaped magnetic poles and orienting in radial direction having O1 as the center for forming a squirrel cage winding; as well as four recesses at the midpoint of the first eccentric circular arcs of the surface of the magnetic poles in each of the fan-shaped magnetic poles.

Such a motor has been disclosed in U.S. Pat. No. 4,358,696 B1. Said invention relates to a permanent magnet rotor configuration which produces four magnetic poles utilizing two sets of symmetrically-disposed permanent magnets. The slots carrying the magnets exhibit a truncated V-shaped configuration, extending from points on the periphery of the rotor to meet the ends of a straight, central portion which lies parallel to a tangent to the rotor shaft. A short magnetic bridge interrupts the center of each slot, the slots being disposed generally symmetrically upon opposite sides of the rotor shaft.

Such a motor is disclosed in U.S. Pat. No. 4,922,152. Said invention relates to a rotor lamination for a permanent magnet synchronous machine. The rotor lamination can be used for a two, four or eight pole synchronous machine. The orientation of the permanent magnets determines the number of poles of the machine. The lamination can also include openings adapted to contain conductors used to bring a synchronous motor up to synchronous speed as an induction motor.

The motors as described in the prior art consists of magnets of a rotor extended up to outer periphery of the rotor thereby magnets has to place before the casting process of the conductor bar hence there is chances of demagnetization subjected to high temperature during casting process. Moreover, the prior arts do not describe about the low voltage starting characteristics of the motor.

BRIEF SUMMARY OF THE INVENTION

The objective of the invention is to provide high frequency self-start synchronous motor capable of starting at a very low voltage.

The further objective of the present invention is to provide an efficient motor with improved starting torque.

Yet another objective of the invention is providing a synchronous motor that is simple; effective; easy to operate; and reducing the cost of permanent magnet synchronous motor drive system.

The present invention achieves the objective by designing a motor that runs on higher efficiency as the rotor electrical losses are zero & the permanent magnet in the rotor supports the flux production, thereby reducing net RMS current in the stator winding.

The present invention is capable of providing high starting torque without any external means and said motor is designed to run at a synchronous speed unlike the permanent magnet synchronous motor and induction motor respectively.

The present invention eliminates the use of drive system thereby reducing the cost involved in the employment of permanent magnet synchronous motor drive system.

The present invention eliminates the problem of demagnetization associated with magnet of the prior arts.

The present invention relates to a self-start energy efficient motor designed in a manner to provide a high starting torque employing the principle of a three phase induction motor and a permanent magnet synchronous motor.

The present invention relates to a motor, said motor comprising of: a stator assembly; a rotor assembly (2); wherein said rotor assembly comprises of a rotor shaft (3); a rotor stack assembly (7), a rotor cover (5) and an end ring (6). The rotor stack assembly (7) further comprises of a stamping stack (4), a magnet (8); and a conductor bar (9). The stamping stack (4) provides slots (10,11) for the conductor bars (9) and the magnets (8) respectively.

According to the invention, said magnet slots (11) are provided towards an inner peripheral portion of the motor and slot (10) that is filled with conductor bars are provided towards an outer peripheral portion of the motor.

According to the invention, said rotor cover (5) is fitted on the rotor stack (7) and the end rings (6) covers both axial ends of the rotor cover (5)

According to the invention, as the current flow in a stator winding, a rotating magnetic field is produced leading to current in the short-circuited conductor bars (9), the current on the stator winding and the rotor bars interact thereby forming a high starting torque. The magnet (8) is placed in the rotor stack (7) and the said rotor cover (5) is mounted on the rotor stack (7), whereby the axial ends of the rotor stack (7) are covered with the end rings (6). As the speed of the rotor stack (7) approaches the synchronous speed, the rotor magnet (8) gets locked with a rotating magnetic field and synchronous process commences the rotation of the motor.

DETAILED DESCRIPTION OF THE INVENTION

The present invention relates to a self-start synchronous motor designed for providing high starting torque. The method of starting the motor involves the principle of three phase induction motor and the motor runs on the principle of permanent magnet synchronous motor. The motor operates by said methods by using a rotor having cage bars with reduced cross section that provides high starting torque and the magnet placed in the rotor to enable the rotation of the motor at synchronous speed.

Figure 3:
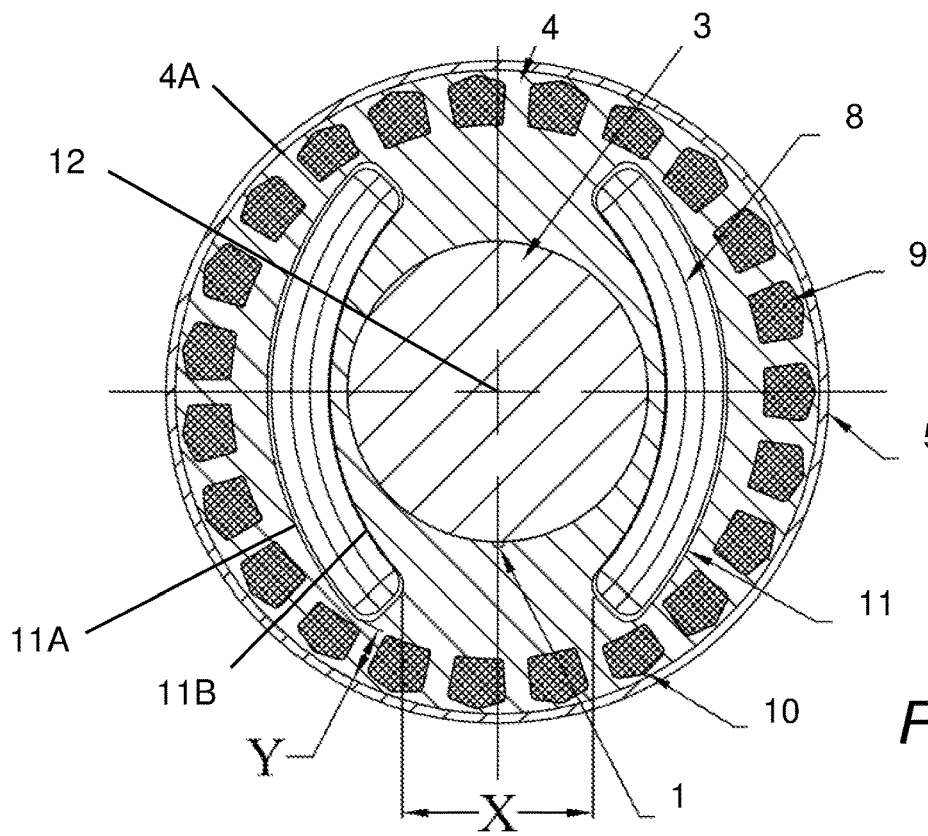
FIG. 3 illustrates the Sectional View of Rotor Assembly

The present invention relates to a motor, said motor comprising of: a stator assembly; a rotor assembly (2); wherein said rotor assembly comprises of a rotor shaft (3); a rotor stack assembly (7) having a stack longitudinal axis or longitudinal axis (12), a rotor cover (5) and an end ring (6). The rotor stack assembly (7) further comprises of a stamping stack (4), a magnet (8); and a conductor bar (9). The stamping stack (4) provides slots (10,11) (such as bar slots 10 and magnet slots 11 as in FIG. 3) for the conductor bars (9) and the magnets (8) respectively.

The magnet (8) is placed in a radially symmetrical manner in the stamping stack (4) having an outer periphery (4A). The magnet slots (11) that are provided towards the inner peripheral portion are at defined interval-x. Each magnet slot has an outer side (11A) facing toward the outer periphery and an inner side (11B) facing away from the outer periphery, as in FIG. 3. Each magnet slot has a magnet arc shape radial to the stack longitudinal axis (12), as in FIG. 3. The interval-x may vary from two to ten times the distance-y, wherein y is the minimum distance between the outer periphery of stamping stack and the edge of the magnet (8).

Figure 1:
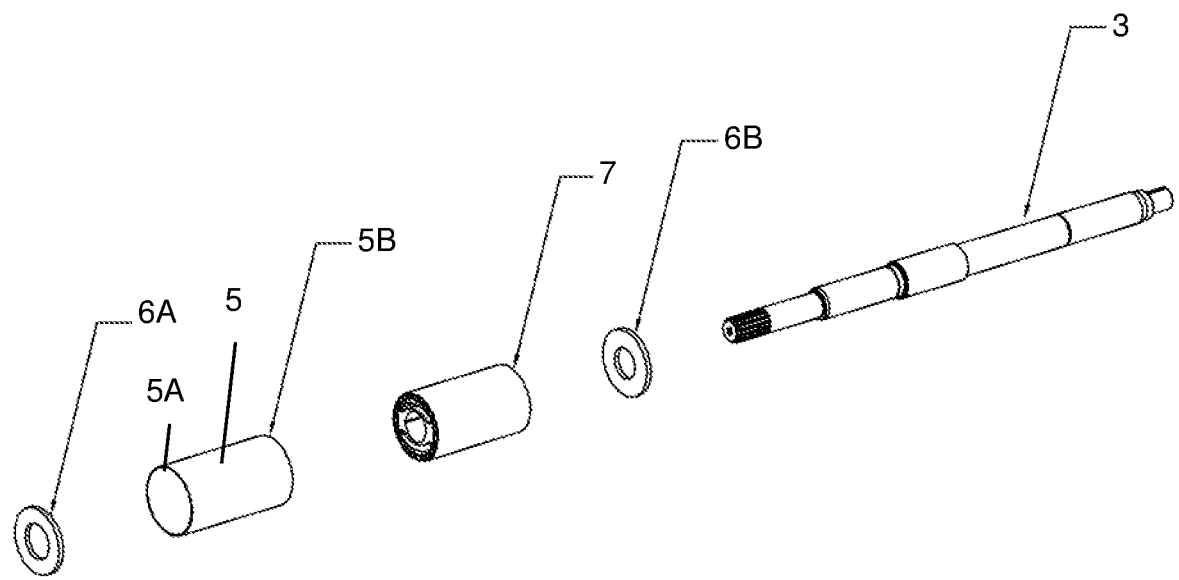
FIG. 1 illustrates the Exploded View of the Rotor Assembly
Figure 2:
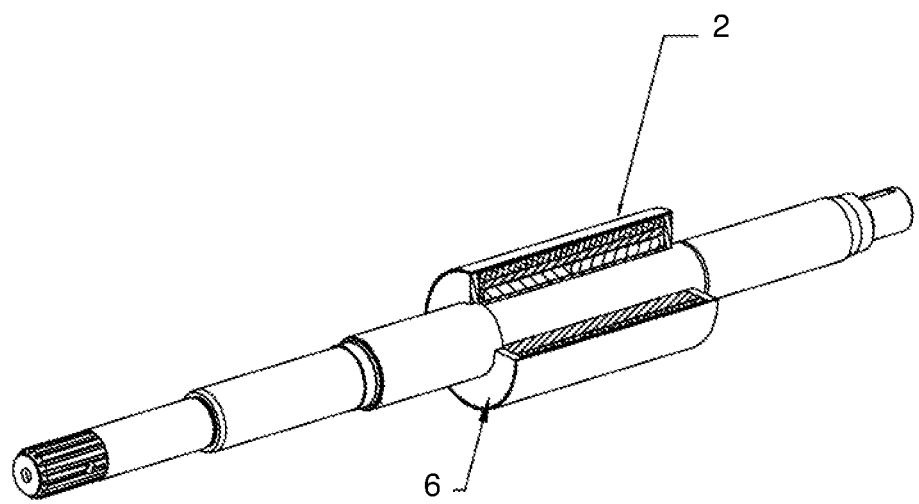
FIG. 2 depicts the Isometric Sectional View of the Rotor Assembly

According to the invention, said rotor cover (5) is fitted on the rotor stack (7) and the end rings (6) covers both axial ends of the rotor cover (5). The rotor cover (5) includes a first axial end (5A) and a second axial end (5B) opposite the first axial end as in FIG. 1. The end rings (6) include a first end ring (6A) connected to the first axial end of the rotor cover, and a second end ring (6B) connected to the second axial end of the rotor cover so as to enclose the rotor stack assembly within the rotor cover, the first end ring, and the second end ring as in FIG. 1.

Figure 4:
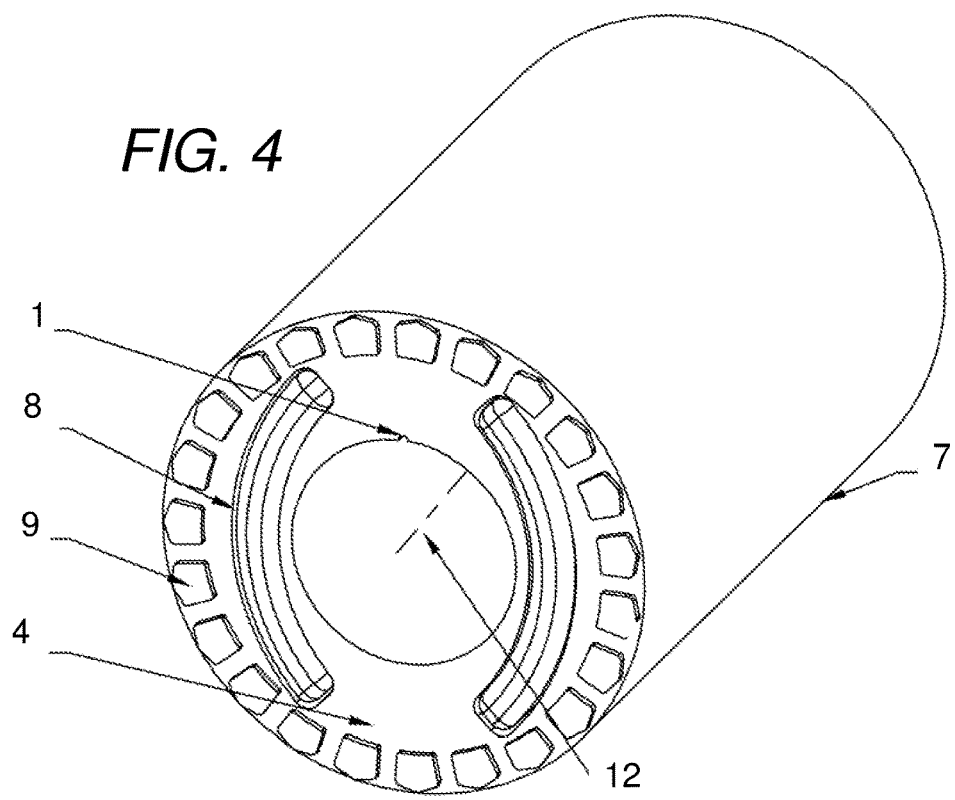
FIG. 4 illustrates the Isometric Sectional View of Stack Assembly
Figure 5:
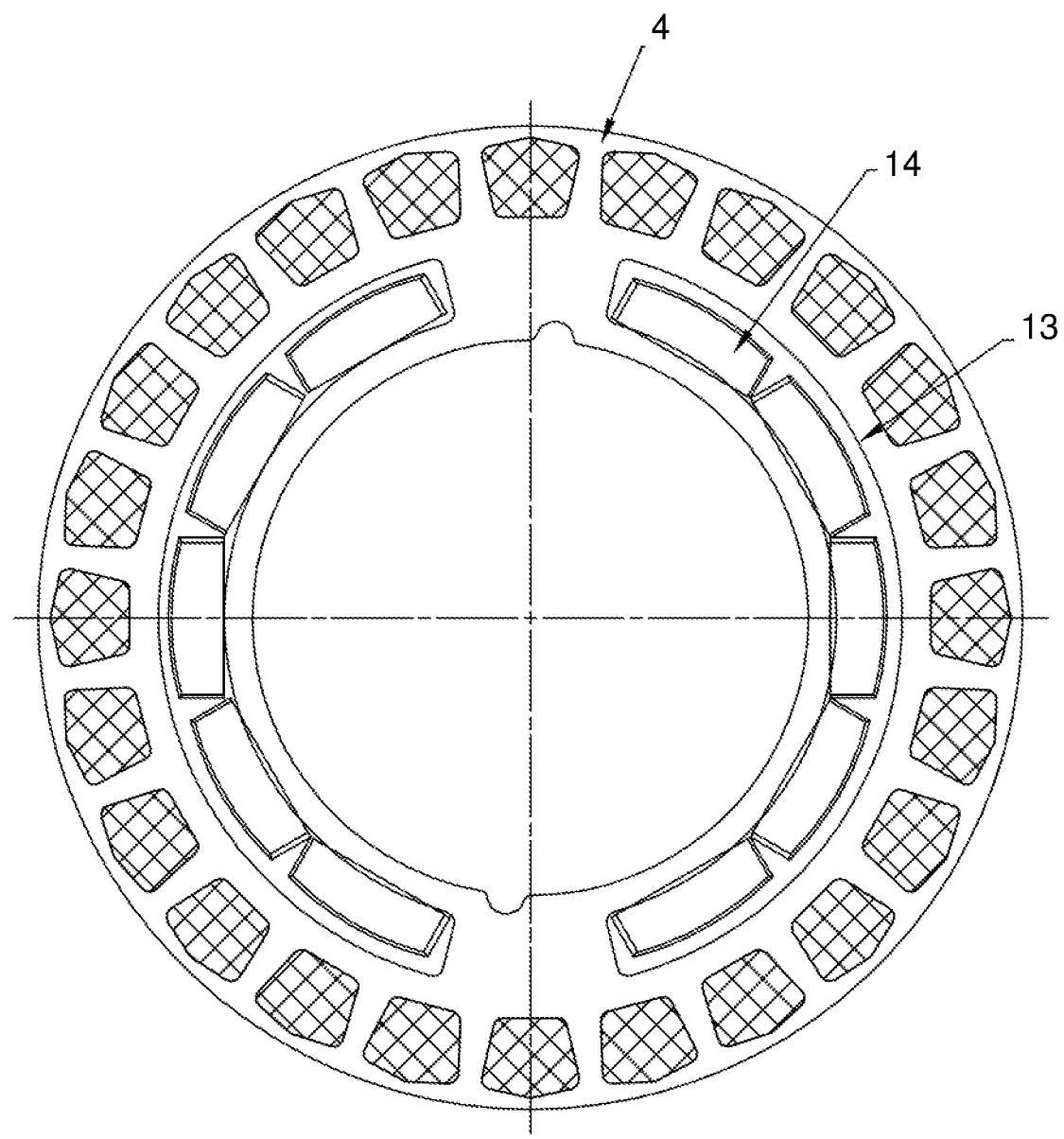
FIG. 5 depicts the Sectional View of second embodiment of Rotor Stack Assembly

The magnet (8) and the slot (11) have a curved cross section normal to the longitudinal axis (12) of the rotor stack, wherein stamping stack (4) has a notch (1) along the longitudinal axis (12). The curved cross section is offset radial from the longitudinal axis (12) as in the embodiment of FIGS. 3-4. All the slots (10) filled with conductor bar have a common inner end radius, that is, each bar slot has a set position along the outer periphery radial to the stack longitudinal axis, while the magnet arc shape of a respective magnet slot varies.

The material of the said conductor bar is selected from a group consisting of aluminum, aluminum alloy and copper, copper alloy.

Said rotor cover (5) may be prepared from materials including, not limiting to, Ferrous Metal, Aluminum, Aluminum Alloy, Copper, Copper Alloy, Zinc, Zinc Alloy, Lead, Lead Alloy, Chromium, Chromium Alloy, Nickel, Nickel Alloy, Tin, Tin Alloy, Silver, Silver Alloy.

Said slot (10) forms a shape of, not limiting to, Round, Pear, Oval, Oblong, Elliptical, Square, Rectangle, Triangle, Equilateral Polygon, Equiangular Polygon, Regular Polygon, and Irregular Polygon.

Said slot (11) possesses a shape, not limiting to, Arc shape, Semi Hexagon Profile, Semi Octagon Profile, Semi Decagon profile, Semi Polygon Profile that is adapted to the shape of the magnet (8).

A number of the magnets (14) are placed in slot (13) to form a shape of, not limited to, arc and trapezoid.

We claim:

1. A high efficiency motor, comprising:
 a stator assembly having a stator winding; and
 a rotor assembly, being rotatable within said stator assembly,
 wherein said rotor assembly comprises:
 a rotor shaft;
 a rotor stack assembly having a stack longitudinal axis;

a rotor cover having a first axial end and a second axial end opposite said first axial end;

a first end ring connected to said first axial end of said rotor cover; and a second end ring connected to said second axial end of said rotor cover so as to enclose said rotor stack assembly within said rotor cover, said first end ring, and said second end ring, wherein said rotor stack assembly comprises:

a stamping stack having an outer periphery;

a plurality of magnet slots, each magnet slot having an outer side facing toward said outer periphery and an inner side facing away from said outer periphery, each magnet slot having a magnet arc shape being offset radial from said stack longitudinal axis;

a plurality of bar slots, each bar slot having a set position during rotation of said rotor assembly along said outer periphery relative to said magnet slots, each bar slot being radial to said stack longitudinal axis and having a variable offset radial distance from said magnet arc shape of a respective magnet slot according to said set position;

a plurality of conductor bars within respective bar slots so as to form a starting torque of the rotor assembly from a rotating magnetic field producing current in said conductor bars; and a plurality of magnets within respective magnet slots, wherein each magnet slot has a defined interval-x corresponding to a minimum magnet slot distance between each magnet slot and an adjacent magnet slot, wherein each magnet has a defined distance-y corresponding to a minimum magnet distance between said outer periphery of the stamping stack and each magnet within a respective magnet slot at a corresponding outer side, wherein said defined interval-x ranges from two to ten times said defined distance-y so as to form a partial starting torque with current through said conductor bars, and wherein all bar slots have a bar arc shape radial to said stack longitudinal axis.

2. The motor as claimed in claim 1, wherein said plurality of magnets is comprised of a first plurality of magnets in one respective magnet slot, and a second plurality of magnets in another respective magnet slot.

3. The motor as claimed in claim 1, wherein at least one magnet has a magnet curved cross section normal to said stack longitudinal axis, and wherein a respective magnet slot of said at least one magnet has a slot curved cross section normal to said stack longitudinal axis.

4. The motor as claimed in claim 1, wherein said stamping stack has a notch along said stack longitudinal axis.

5. The motor as claimed in claim 1, wherein each conductor bar is comprised of a material selected from a group consisting of Aluminum and Copper.

6. The motor as claimed in claim 1, wherein said rotor cover is comprised of a material selected from a group consisting of: Ferrous Metal, Aluminum, Aluminum Alloy, Copper, Copper Alloy, Zinc, Zinc Alloy, Lead, Lead Alloy, Chromium, Chromium Alloy, Nickle, Nickle Alloy, Tin, Tin Alloy, Silver, and Silver Alloy.

\* \* \* \* \*